UNITED STATES PATENT OFFICE.

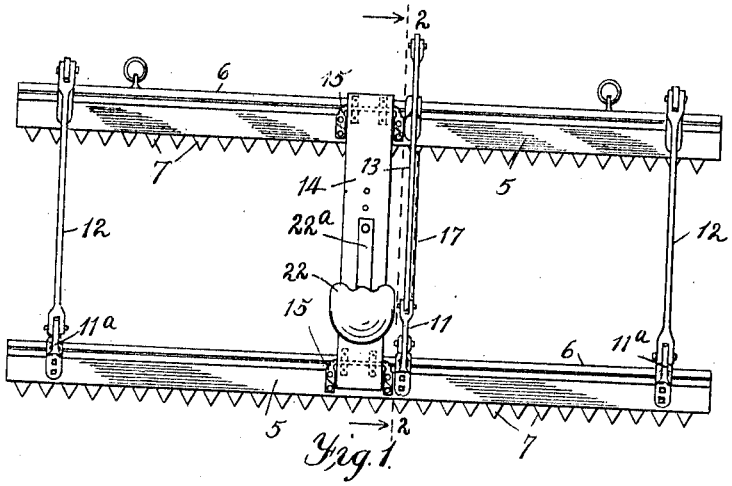
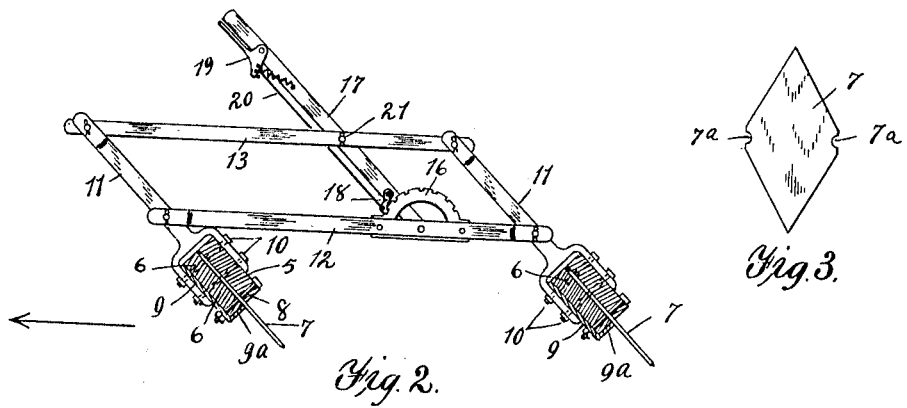
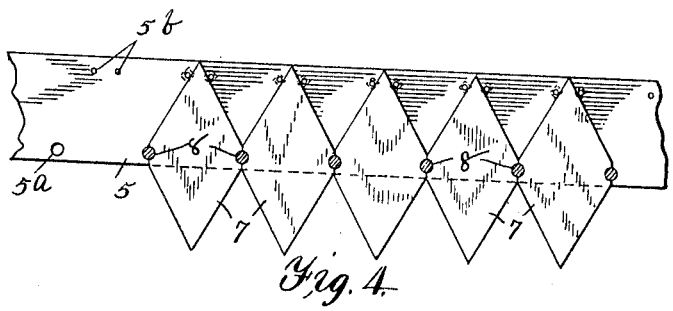

OSCAR A. GARWOOD, OF LAPORTE, INDIANA.

LAND-PULVERIZER.

980,242.  Specification of Letters Patent.  Patented Jan. 3, 1911.

Application filed December 15, 1909. Serial No. 533,141.

*To all whom it may concern:*

Be it known that I, OSCAR A. GARWOOD, citizen of the United States, residing at Laporte, in the county of Laporte and State of Indiana, have invented certain new and useful Improvements in Land-Pulverizers, of which the following is a specification.

This invention relates to improvements in agricultural implements of the type used for pulverizing the soil after the usual plowing operations have been performed, in order that the surface of the soil may be in the best possible condition for the germination of the seed when sown.

The especial object of the improvements hereinafter set forth is to produce a soil surfacer and pulverizer which will be adapted to soils of either light or heavy character; which can be economically manufactured; which will have great durability and which may be adjusted readily in operation so as to provide the maximum of effective impact with the soil.

Having the aforegoing and other objects of general utility in view, I have produced the improved implement shown in the approved form in the accompanying drawing which forms a part of this application, in which:—

Figure 1 is a top plan view of the implement complete; Fig. 2 is a view partly in section on the line 2—2 of Fig. 1, and partly in elevation of said implement in operative position; Fig. 3 is a view of one of the teeth or blades which forms an important element of the implement, and Fig. 4 is a fragmentary view showing a plurality of teeth in their assembled relation and illustrating the manner in which they are held in such relation.

Referring to the details of the drawing, 5 and 6 represent rectangular bars preferably made of wood which extend in two separate pairs transversely of the implement and form primarily the supporting means for the metal teeth 7 which are placed side by side between said bars as shown in Fig. 4. The teeth 7 are formed in diamond or double pointed shape and are provided midway their points with notches 7ª in their edges. When the teeth are assembled in operative relation the notches 7ª register and form recesses which are engaged by bolts 8 which pass through suitable openings 5ª in the clamping bars 5 and 6 and are held in place by the usual nuts. The edges of the teeth 7 adjacent to the notches are straight so that when the teeth are assembled side by side these abutting edges aid in holding the teeth in upright operative position. As a further means of supporting the teeth in this position I insert through the bars 5 and 6 small bolts and pins which pass through holes 5ᵇ in the clamping bars 5 and 6. These holes and small bolts are so positioned that they bear on opposite edges of the teeth 7 and thus hold the same rigidly against displacement.

Extending along the outer side of each of the bars 6 is a metal plate 9 the lower edge of which is bent up to form an inwardly turned flange 9ª which extends along the lower edge of the clamping bar 6 said plate with its flange forming a guard or protector for the clamping bar 6. Secured to the clamping bars by bolts 10 are posts 11 which are arranged near each end and midway of the bars and the posts of one pair of bars are connected with the posts of the other pair by parallel links 12—13. These bars are further connected by a seat supporting plank 14 and upright yokes 15 which are rigidly bolted to the clamping bars midway their ends. Bolted to the mid link 12 is a notch segment 16 and pivoted on said bar is a lever 17 having a pawl 18 adapted to engage notches in the segment 6 said pawl being operated by a handle 19 pivoted near the upper end of the lever 17 and connected with the pawl 18 by a rod 20 said segment pawl lever and pawl operating device being of well known construction and operation. The lever 17 is also pivoted at 21 to the link 13. The manner of using an implement constructed as indicated and described is so apparent as to need no description especially as the means for connecting and adjusting the clamping bars are old and well known. The double pointed teeth 7 are so constructed and arranged that any one or two teeth can be removed if broken or worn out by simply loosening the bolts from the clamping bars without removing or displacing the remaining teeth. It will be apparent that when the bolts 8 are loosened, the teeth may be turned on their longitudinal axis until their notches clear the bolts, thus permitting the removal of the tooth or teeth so manipulated, and the insertion of new teeth. As these teeth are alike at both ends when one point is worn out the tooth may be reversed and replaced between the clamping bars thus presenting the new or unworn point. These teeth when assembled present zig-zag or saw tooth formation which combines the crushing action of the flat surface and the cutting action due to the pointed ends. Assuming that the direction of movement of the pulverizer described is that indicated by the arrow in Fig. 2, it will be seen that the plates 9, 9ª, will be brought more or less in contact with the surface of the ground which is being pulverized and will therefore receive the impact of the clods or lumps of soil and as the weight of the entire implement including the operator is carried on said teeth and bars these plates will exercise a crushing influence upon the clods similar to that due to the use of the ordinary crusher. These metal plates serve not only to protect the bars 6 from wear but as they become polished from frictional contact with the dirt they will ease the draft upon the horses drawing the implement and cause the latter to slide easily over the surface of the ground. It will be seen therefore that the construction and arrangement of the teeth with the clamping bars and wear plates 9 are important elements of my invention.

As an incident of the implement attention is called to the arrangement of the seat 22 which is connected with the plank 14 by a standard 22ª which is bolted to the plank 14, several holes in the latter being provided so that the position of the seat may be adjusted if desired.

It will be noted that as the seat plank 14 is connected with the clamping bars by the supporting irons the relative position of the plank to the clamping bars will be changed by the setting of the bars at different angles. The plank 14 is secured to the irons 15 by metal clips on the underside of the plank which embrace the round portions of the irons 15 so that the latter may turn in said clips. It will also be noted that the end links 12 are pivoted on posts 11ª which are shorter than the posts 11 at the middle of the implement.

Having thus described my invention what I claim is:—

1. In a land pulverizer, a plurality of pointed teeth, bars clamping said teeth therebetween and bolts connecting said bars and engaging the edges of said teeth so that one or more teeth can be removed without displacing the remaining teeth or removing said bolts.

2. In a land pulverizer, a plurality of invertible double pointed teeth, bars clamping said teeth therebetween, and bolts connecting said bars and engaging the edges of said teeth so that one or more teeth can be removed without removing any of said bolts or displacing the remaining teeth.

3. In a land pulverizer, a pulverizing unit consisting of a diamond shaped flat metal tooth having notches in its edges, and means for clamping and for holding said tooth in operative position, said holding means engaging said notches.

4. In a land pulverizer, a plurality of pairs of clamping bars, a plurality of flat V-shaped teeth arranged between each pair of bars, means for holding the members of each pair of bars in opposition, said means adapted to engage and removably hold in position said teeth and means for supporting said bars in different operative position.

In testimony whereof I affix my signature in the presence of two witnesses.

OSCAR A. GARWOOD.

Witnesses:
 FRED A. HAUSHEER,
 WILLIAM H. BOSSEWEAR.